(12) United States Patent
Atilim et al.

(10) Patent No.: US 12,605,236 B2
(45) Date of Patent: Apr. 21, 2026

(54) METHOD OF PRODUCING A DENTAL RESTORATION

(71) Applicant: Ivoclar Vivadent AG, Schaan (LI)

(72) Inventors: Eser Atilim, Lindau (DE); Hendrik John, Buchs (CH)

(73) Assignee: Ivoclar Vivadent AG, Schaan (LI)

( * ) Notice: Subject to any disclaimer, the term of this patent is extended or adjusted under 35 U.S.C. 154(b) by 122 days.

(21) Appl. No.: 18/520,280

(22) Filed: Nov. 27, 2023

(65) Prior Publication Data

US 2024/0299144 A1     Sep. 12, 2024

(30) Foreign Application Priority Data

Nov. 28, 2022     (EP) .................................... 22209984

(51) Int. Cl.
| | |
|---|---|
| *A61C 13/00* | (2006.01) |
| *B33Y 10/00* | (2015.01) |
| *B33Y 50/02* | (2015.01) |
| *B33Y 70/00* | (2020.01) |

(52) U.S. Cl.
CPC .......... *A61C 13/0019* (2013.01); *B33Y 10/00* (2014.12); *B33Y 50/02* (2014.12); *B33Y 70/00* (2014.12)

(58) Field of Classification Search
CPC ............ A61C 13/0019; A61C 13/0006; A61C 13/0004; A61C 13/08; A61C 5/77; B33Y 10/00; B33Y 50/02; B33Y 70/00; B33Y 80/00; A61K 6/80; G06T 7/11; G06T 7/90; G06T 2200/08
See application file for complete search history.

(56) References Cited

U.S. PATENT DOCUMENTS

| | | |
|---|---|---|
| 11,787,120 B2 | 10/2023 | Barua |
| 2010/0131244 A1 | 5/2010 | Murakawa et al. |
| 2011/0276159 A1 | 11/2011 | Chun et al. |
| 2018/0333235 A1 | 11/2018 | Kim et al. |
| 2019/0110871 A1 | 4/2019 | Frydrychewicz |
| 2022/0143922 A1 | 5/2022 | Barua |
| 2023/0218373 A1 | 7/2023 | Blay et al. |

FOREIGN PATENT DOCUMENTS

| | | | | |
|---|---|---|---|---|
| CN | 106037967 A | * | 10/2016 | ......... A61C 13/0004 |
| CN | 113397743 A | * | 9/2021 | ......... A61C 13/0004 |
| JP | 6-78937 A | | 3/1994 | |
| JP | 7-328042 A | | 12/1995 | |
| JP | 2003-116884 A | | 4/2003 | |

* cited by examiner

*Primary Examiner* — Charles Cai
(74) *Attorney, Agent, or Firm* — Ann M. Knab; Thad McMurray

(57)     ABSTRACT

A method of producing a dental restoration (100), including the steps of calculating (S101) a pressure distribution (101) on the oral mucosa (105) through the dental restoration (100) based on a three-dimensional data set (103-DS) of the dental restoration (100) and a three-dimensional data set (103-MS) of the oral mucosa (105); and determining (S102) a spatial region (107) for an elastic production material (109) within the dental restoration (100) based on the calculated pressure distribution (101).

16 Claims, 6 Drawing Sheets

Fig. 2 contact pressure

Figure 2:
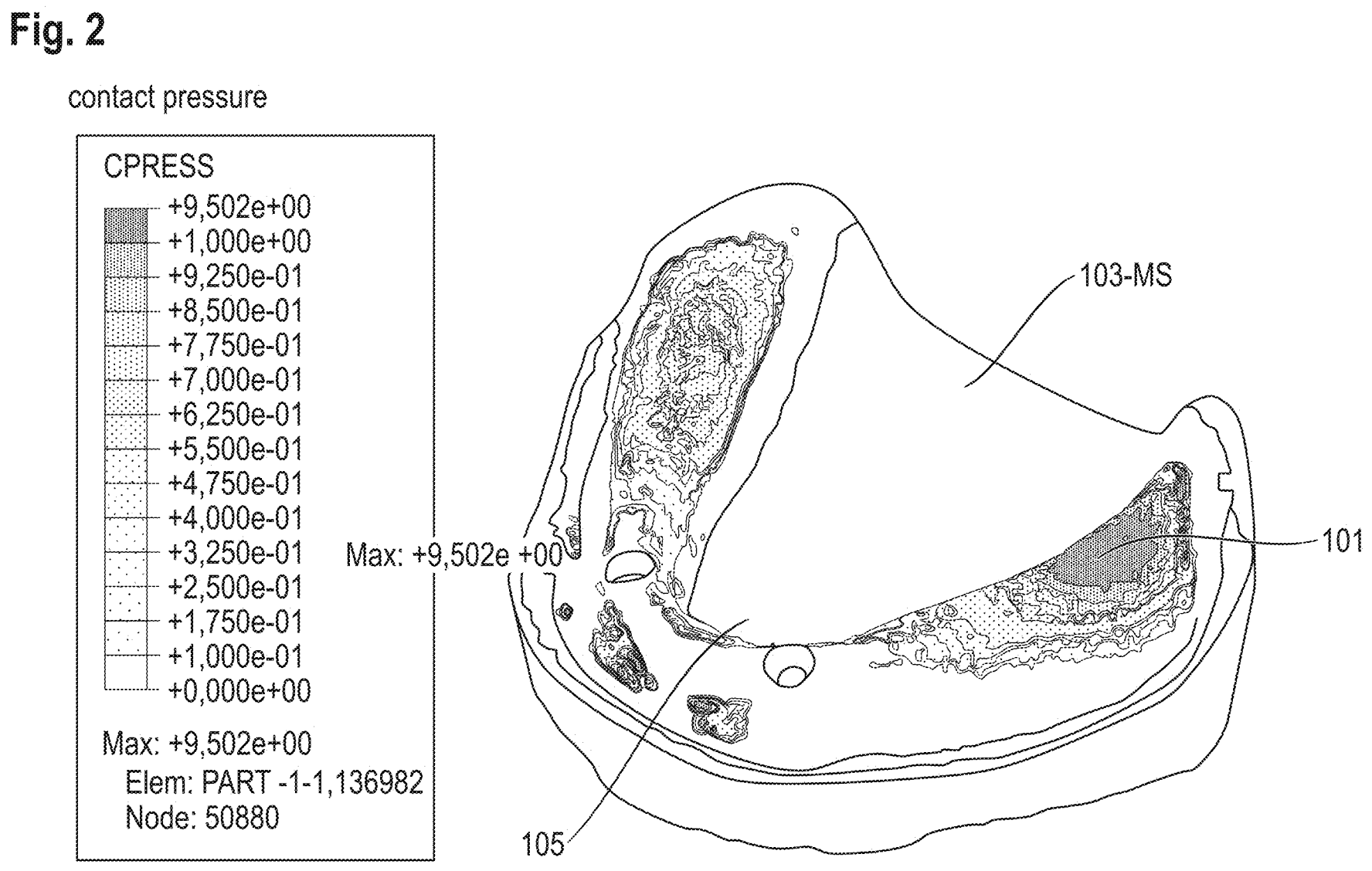

CPRESS
+9,502e+00
+1,000e+00
+9,250e-01
+8,500e-01
+7,750e-01
+7,000e-01
+6,250e-01
+5,500e-01
+4,750e-01
+4,000e-01
+3,250e-01
+2,500e-01
+1,750e-01
+1,000e-01
+0,000e+00

Max: +9,502e+00
Elem: PART -1-1,136982
Node: 50880

Max: +9,502e +00

101

103-MS

105

S101 pressure distribution on the oral mucosa through the dental restoration is calculated based on three-dimensional data sets of the dental restoration and the oral mucosa

S102 a spatial region for the elastic production material within the dental restoration is determined based on the calculated pressure distribution

METHOD OF PRODUCING A DENTAL RESTORATION

CROSS-REFERENCE TO RELATED APPLICATIONS

This application claims priority to European Patent Application No. 22209984.8 filed on Nov. 28, 2022, the disclosure of which is incorporated herein by reference in its entirety.

TECHNICAL FIELD

The present invention relates to a method of producing a dental restoration and a production device for producing a dental restoration.

BACKGROUND

Currently, producing prostheses is a labor-intensive process. Especially the optimization of the prosthesis geometry to achieve the highest possible wearing comfort often requires numerous visits to the doctor.

U.S. 20110276159 and 20180333235 are directed to methods of making dental restorations and are hereby incorporated by reference in their entirety.

SUMMARY

It is the technical object of the present invention to increase the wearing comfort of a dental restoration and to reduce pain and discomfort when wearing the dental restoration.

This technical object is solved by the subject matter according to the independent claims. Technically advantageous embodiments are the subject of the dependent claims, the description and the drawings.

According to a first aspect, the technical object is solved by a method of producing a dental restoration, comprising the steps of calculating a pressure distribution on the oral mucosa through the dental restoration based on a three-dimensional data set of the dental restoration and a three-dimensional data set of the oral mucosa; and determining a spatial region for an elastic production material within the dental restoration based on the calculated pressure distribution. The spatial region forms a subvolume of the dental restoration. The method achieves the technical advantage of improving the wearing comfort of the dental restoration. In addition, long-term residual ridge resorption of the dental restoration can be prevented.

In a technically advantageous embodiment of the method, a production material for the spatial region is determined based on the pressure distribution. The production material can be selected from a plurality of production materials. This achieves the technical advantage, for example, that not only an extension of the spatial region, but also a production material can be determined based on the pressure distribution. As a result, the wearing comfort of the dental restoration can be further improved.

In a further technically advantageous embodiment of the method, the pressure distribution is calculated by means of a finite element method. This achieves the technical advantage, for example, that the pressure distribution can be calculated in a fast way with high accuracy. U.S. Pat. No. 11,787,120, 20100131244, 20230218373, 20190110871 and 20220143922 are directed to systems and methods of using finite element methods and are hereby incorporated by reference in their entirety.

In another technically advantageous embodiment of the method, the pressure distribution is calculated in the presence of a predetermined force on the dental restoration. This achieves the technical advantage, for example, that occurring forces can be taken into account when calculating the pressure distribution and when designing the spatial region.

In a further technically advantageous embodiment of the method, the predetermined force is determined by a bite block sensor. This achieves the technical advantage, for example, that realistic forces and points of application are used when calculating the pressure distribution.

In another technically advantageous embodiment of the method, a pressure distribution on the dental restoration is calculated from the pressure distribution on the oral mucosa. This achieves the technical advantage, for example, that the spatial region within the dental restoration can be precisely adjusted.

In another technically advantageous embodiment of the method, a thickness of the spatial region is proportional to the pressure distribution on the dental restoration. This achieves the technical advantage, for example, that the spatial region can be calculated in a simple manner.

In another technically advantageous embodiment of the method, the production material in the spatial region has a lower modulus of elasticity than the production material outside the spatial region. This achieves the technical advantage, for example, that the wearing comfort of the dental restoration can be increased.

In another technically advantageous embodiment of the method, the dental restoration is produced by means of a three-dimensional printing process. This achieves the technical advantage, for example, that the dental restoration can be produced in a simple manner.

In another technically advantageous embodiment of the method, the three-dimensional printing process uses a free-jet material deposition. This achieves the technical advantage, for example, that the production of the dental restoration is further improved.

According to a second aspect, the technical object is solved by a production device for producing a dental restoration, comprising a calculation device for calculating a pressure distribution on the oral mucosa through the dental restoration based on a three-dimensional data set of the dental restoration and a three-dimensional data set of the oral mucosa; and a determination device for determining a spatial region for an elastic production material within the dental restoration based on the calculated pressure distribution.

In a technically advantageous embodiment of the production device, the calculation device is configured to calculate the pressure distribution using a finite element method. This also achieves the technical advantage, for example, that the pressure distribution can be calculated in a fast manner with high accuracy.

In another technically advantageous embodiment of the production device, the determination device is configured to determine a thickness of the spatial region proportional to the pressure distribution on a dental restoration.

In another technically advantageous embodiment of the production device, the production device is configured to use a production material with a lower modulus of elasticity inside the spatial region than outside the spatial region.

In another technically advantageous embodiment of the production device, the production device comprises a 3D printer. This provides the technical advantage, for example, that the dental restoration can be produced in a simple manner.

The production device and/or determining device may include computer(s)/devices and server computer(s) to provide processing, storage, and input/output devices executing application programs and the like. The computer(s)/devices can also be linked through communications network to other computing devices. The communications network can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

I/O device interfaces for connecting various input and output devices include, but are not limited to e.g., keyboard, mouse, displays, printers, speakers, etc. A memory provides volatile storage for computer software instructions and data used to implement an embodiment of the present invention. Disk storage provides non-volatile storage for computer software instructions and data used to implement an embodiment of the present invention. A central processor unit can be used to provide for the execution of computer instructions.

In one embodiment, the processor routines and data are a computer program product, including a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program.

BRIEF DESCRIPTION OF THE DRAWINGS

Exemplary embodiments of the invention are shown in the drawings and are described in more detail below, in which:

FIG. 2 shows a pressure distribution on an oral mucosa;

DETAILED DESCRIPTION

Figure 1:
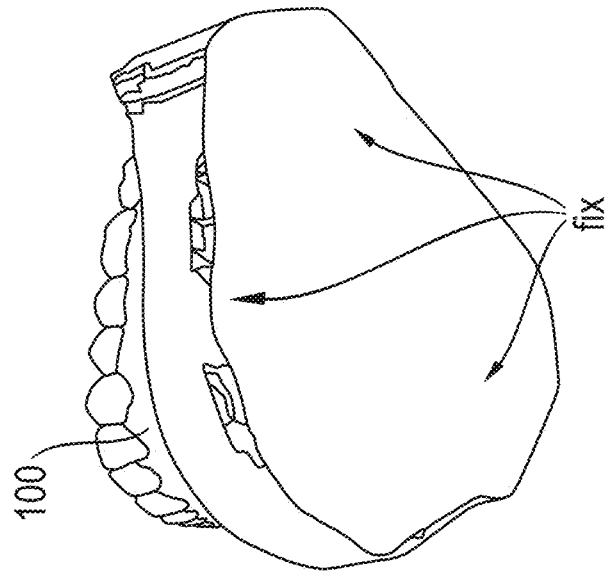
FIG. 1 shows a perspective view of a dental restoration within an oral cavity.
Figure 1:
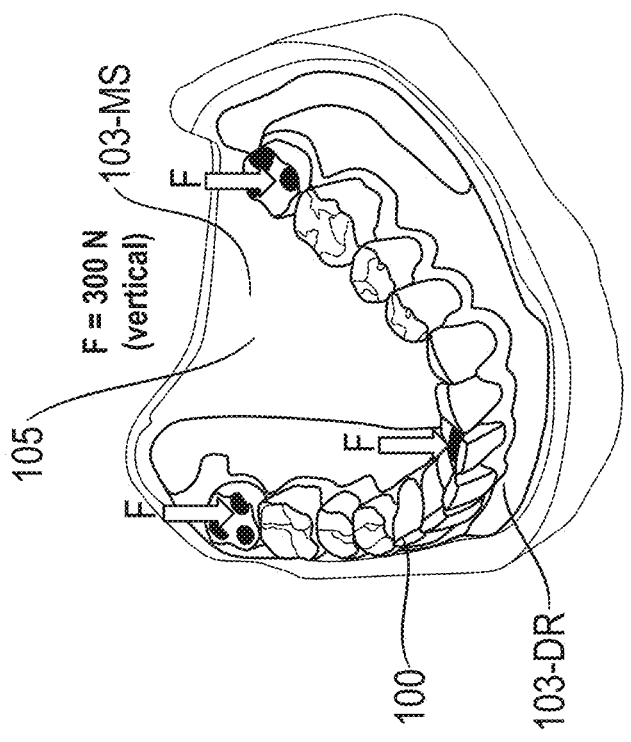

FIG. 1 shows a perspective view of a dental restoration 100 within an oral cavity. The dental restoration 100 is, for example, a partial or full prosthesis that is at least partially seated on and in contact with an oral mucosa 105. The shape of the dental restoration 100 is specified in a three-dimensional data set 103-DR. This can additionally comprise color data or data on the production material to be used for the dental restoration 100. The shape of the patient's oral mucosa 105 is also stored in a three-dimensional data set 103-MS. Different forces F are exerted on the dental restoration when it is worn, for example when chewing food.

FIG. 2 shows a pressure distribution 101 on the oral mucosa 105 through the dental restoration 100. The pressure distribution 101 is calculated from the three-dimensional data set 103-DR of the dental restoration 100 and the three-dimensional data set 103-MS of the oral mucosa 105. For this purpose, a finite element method (FEM) can be performed to simulate the pressure distribution 101 of a contact of the dental restoration 100 on the oral mucosa 105. The calculations consider the mechanical material properties of both the oral mucosa and the prosthesis. A non-linear material model is used to describe the mechanical properties of the oral mucosa. On the other hand, the material behavior of the prosthesis material can be assumed to be linear-elastic. In addition, geometric non-linearities must be considered for the contact point between the prosthesis and the oral mucosa. By fully describing the mechanical properties of each material, an FEM-based contact algorithm can be used to calculate the pressure distribution. On the oral mucosa 105, there are regions where the dental restoration 100 exerts a low pressure on the oral mucosa 105 and regions where the dental restoration 100 exerts a high pressure on the oral mucosa 105.

When simulating the pressure distribution 101, the occlusal surface of the dental restoration 100 during a chewing process can be taken into account. For this purpose, different chewing processes can be simulated depending on a location and a type of food to obtain a pressure distribution 101 of a contact pressure of the dental restoration 100 on the oral mucosa 105. To optimize the dental restoration 100, a case can be selected in which the most unfavorable forces (worst case scenario) occur. This results in a maximum peak contact pressure on the oral mucosa 105.

The simulated local peak contact pressure can then be minimized by using elastic production materials 109 of the dental restoration 100 that have a lower modulus of elasticity than the production materials 113 of the rest of the dental restoration 100. Through simulation, a thickness of the production material 109 with the lower modulus of elasticity can be optimized to maintain a peak contact pressure below a pressure pain threshold. For example, the Shore hardness (scale A) of the production material 109 is in a range between 35 and 60 (ISO 7619-1). The tensile strength is, for example, but not limited to, between 5.5 and 8.5 N/mm$^2$ (ISO 37 Type 4).

The elastic production material 109 for the spatial region 107 is, for example, an elastomer, such as silicone. The production material 113 for the dental restoration 100 is, for example, an unfilled or filled methyl methacrylate (MMA) and typically has a hardness in the range between $41.63\pm2.03$ and $34.62\pm2.1$ (Vickers hardness). For example, a flexural strength (MPa) ranges from, but is not limited to, $86.63\pm1.0$ to $69.15\pm0.88$. For example, an impact strength (KJ/m$^2$) ranges from, but is not limited to, $6.32\pm0.50$ to $2.44\pm0.31$. The production material 109 for the spatial region 107 is softer or more elastic than the production material 113 for the dental restoration 100.

Figure 3:
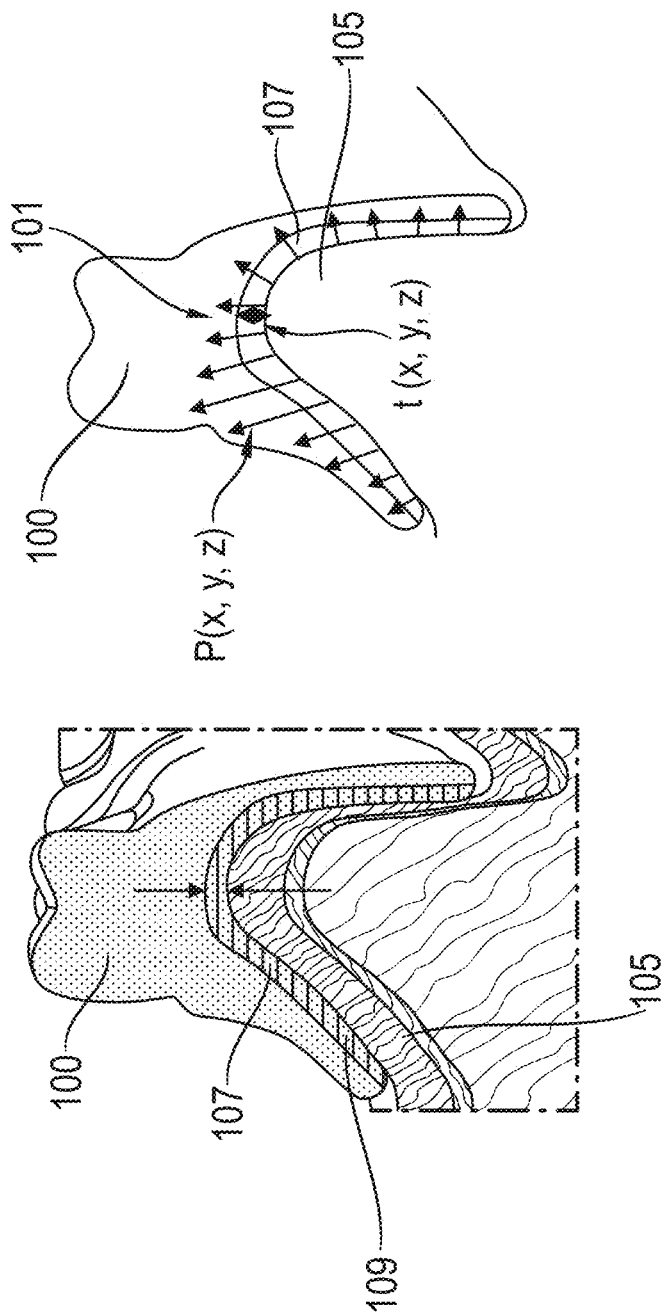
FIG. 3 shows a cross-sectional view through the dental restoration and the oral mucosa.

FIG. 3 shows a cross-sectional view through the dental restoration 100 and the oral mucosa 105. After defining predetermined forces on the dental restoration 100, an optimization algorithm can be used to push the peak contact pressure of the dental restoration 100 below the patient's pressure pain threshold. For this purpose, the three-dimensional data set 103-DR of the dental restoration 100 is used in combination with the three-dimensional data set 103-MS of the oral mucosa 105. First, a pressure distribution 101 on the oral mucosa 105 is calculated under the given forces.

In doing so, a thickness t(x,y,z) of a spatial region 107 of the elastic production material 109 is optimized such that a pressure distribution P(x,y,z) that is as uniform as possible is applied to the oral mucosa 105. Assuming an initial monolithic or homogeneous material distribution in the base of the dental prosthesis 100, a three-dimensional distribution of an elastic production material 109 is derived by the simulated pressure distribution P(x,y,z) on the oral mucosa 105. This procedure may be iteratively repeated several times, for example until a peak contact pressure of the pressure distribution 101 is below a predetermined value.

The algorithm may be executed on a computer having stored thereon a program for executing the method. For this purpose, the computer comprises a processor with which instructions for executing the algorithm are processed and a digital memory in which the three-dimensional data sets 103 of the oral mucosa 105 and the dental restoration 100 are stored.

Figure 4:
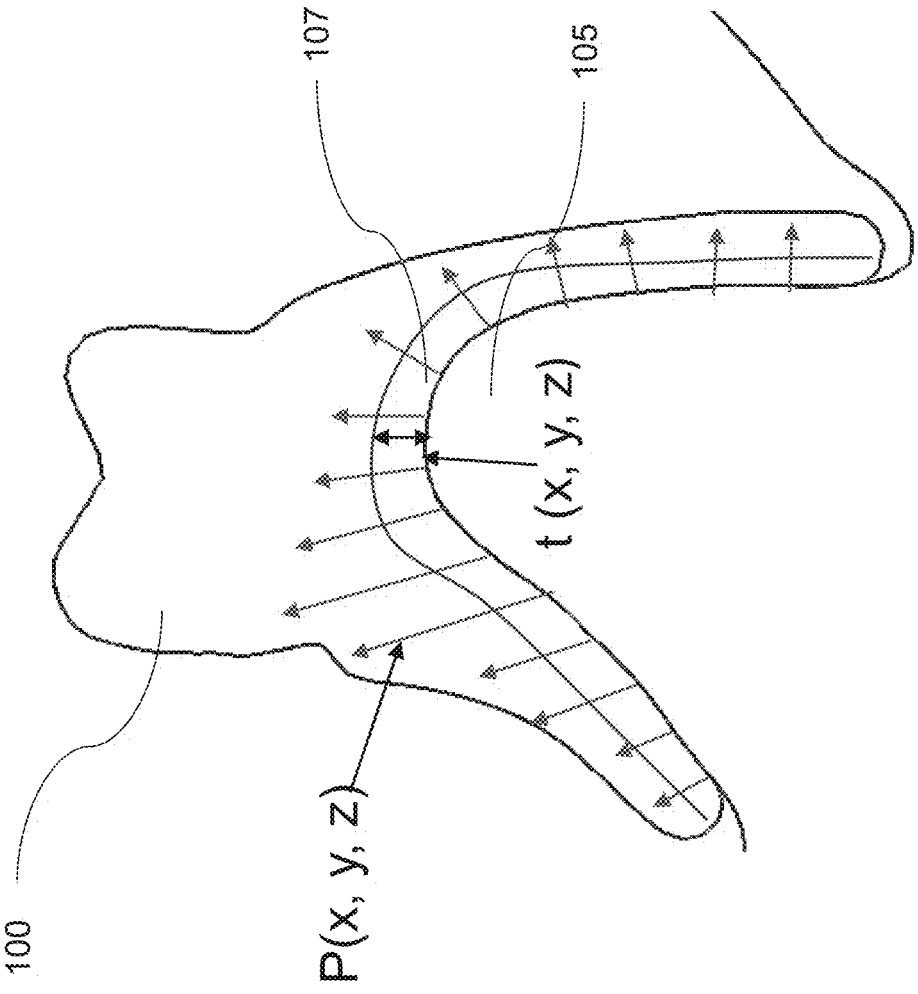
FIG. 4 shows another cross-sectional view through the dental restoration and the oral mucosa.

FIG. 4 shows another cross-sectional view through the dental restoration 100 and the oral mucosa 105. The pressure distribution 101 on the surface is given by force vectors per unit area, where the force vectors originate from the vertices and are ideally perpendicular to the surface or vertex. The local thickness of the elastic production material 109 at the basal surface of the prosthesis base is calculated by applying a constant conversion factor to each force vector.

In this way, a new internal surface is created by defining new vertices at the end of each recalculated vector. In this way, a spatial region 109 can be calculated whose local thickness depends on the pressure distribution 101 of the dental restoration 100. Together with the outer basal surface where the force vectors abut the vertices, the newly generated internal area creates a sub-volume of the dental restoration. The elastic production material 109 is placed in the spatial region 107 of the sub-volume. The shape and position of the spatial region 107 can be integrated into the three-dimensional data set 103-DR of the dental restoration 100.

To avoid an intersection or overlap of the original base volume and the newly created spatial region 109 for the elastic production material 109 of the dental restoration 100, a Boolean operation is applied to subtract the newly created spatial region from the volume of the original dental restoration 100. In the print CAM software, the material types are assigned to the separated spatial regions depending on their modulus of elasticity.

In general, the calculation of the spatial region for the elastic production material 109 may be calculated in other ways. For example, once a value of the pressure distribution 101 is above a predetermined value, a spatial region 107 having a predetermined thickness may also be provided.

Figure 5:
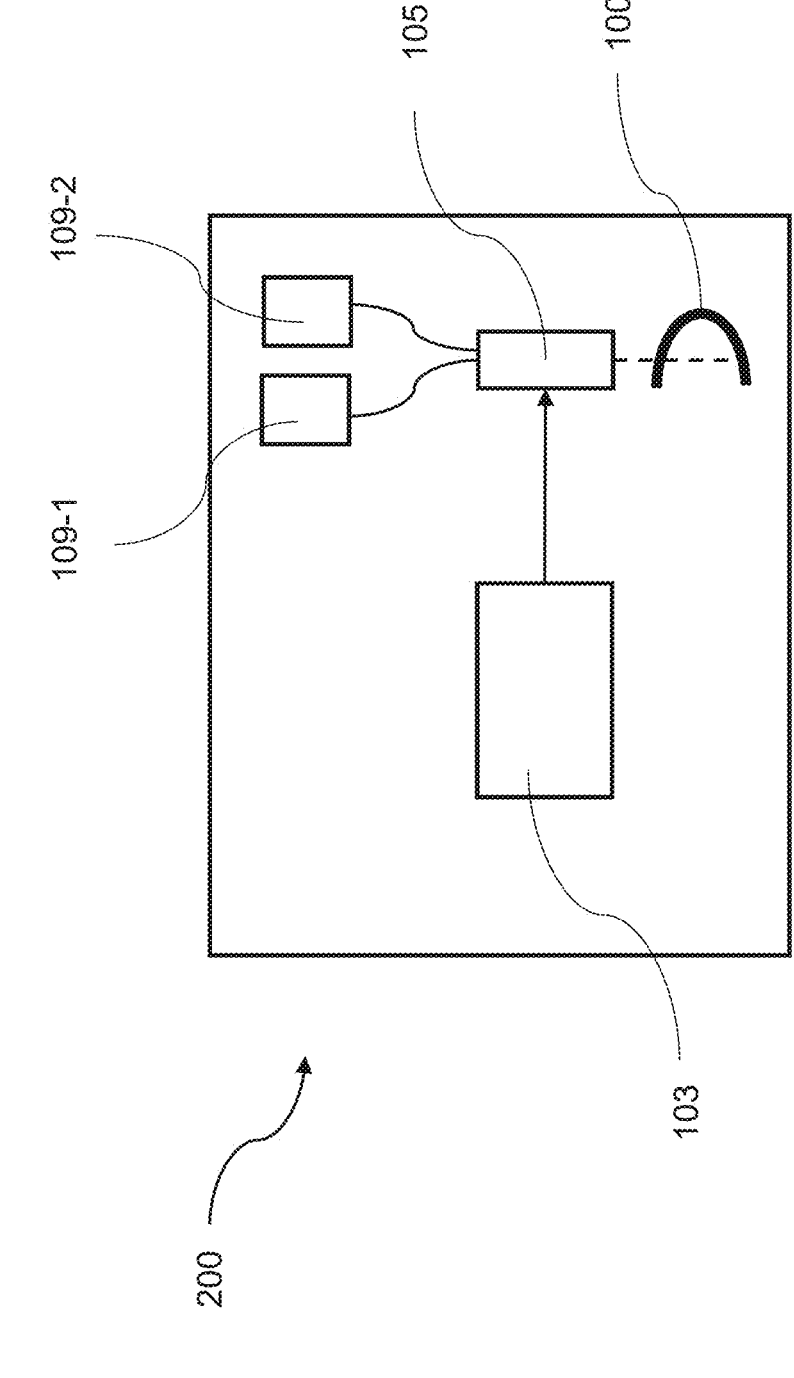
FIG. 5 shows a schematic view of a production device for producing a dental restoration.

FIG. 5 shows a production device 200 for producing a dental restoration showing two different production material containers 109-1 and 109-2.

Figure 6:
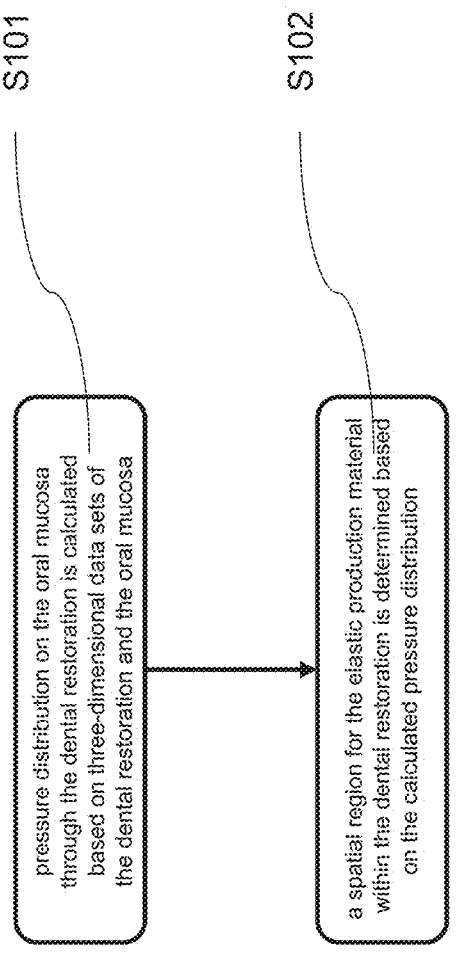
FIG. 6 shows a block diagram of a method for producing the dental restoration.

FIG. 6 shows a block diagram of a method of producing the dental restoration 100. In step S101, the pressure distribution 101 on the oral mucosa 105 through the dental restoration 100 is calculated based on a three-dimensional data set 103-DS of the dental restoration 100 and a three-dimensional data set 103-MS of the oral mucosa 105. Subsequently, in step S102, a spatial region 107 for the elastic production material 109 within the dental restoration 100 is determined based on the calculated pressure distribution 101. Subsequently, the dental restoration 100 is produced with the elastic production material 109.

In order to arrange the different production materials 109 at different locations within the three-dimensional model, an additive manufacturing process in which selective material application of different materials is possible (extrusion, free-jet process, inkjet) can preferably be used, with the different materials having different moduli of elasticity.

For example, the hard and strong production material of the dental restoration 100 (in container 109-1 in FIG. 5) may be methyl methacrylate (MMA) and the elastic production material 109 (in container 109-2 in FIG. 5) may be a light-curable medical grade silicone. By having a hard and a soft production material within the system 200, an intermediate modulus of elasticity can also be achieved by mixing the two production materials in a certain ratio.

The method increases the wearing comfort of the dental restoration while taking into account the individual anatomy of a patient. Pain or discomfort due to inhomogeneous pressure distribution on the dental restoration 100 can be minimized. Long-term residual ridge resorption can be prevented. In addition, better long-term wearing comfort will be achieved due to the elastic material in contact with the oral mucosa, which effectively allows for anatomical development of the oral mucosa.

All of the features explained and shown in connection with individual embodiments of the invention may be provided in different combinations in the subject matter of the invention to simultaneously realize their beneficial effects.

All method steps can be implemented by devices which are suitable for executing the respective method step. All functions that are executed by the features of the subject matter can be a method step of a method.

The scope of protection of the present invention is given by the claims and is not limited by the features explained in the description or shown in the figures.

REFERENCE LIST

100 dental restoration
101 pressure distribution
103 data set
105 oral mucosa
107 spatial region
109 production material
113 production material

The invention claimed is:

1. A method of producing a dental restoration, comprising the steps of:
    calculating a pressure distribution on an oral mucosa through the dental restoration based on a three-dimensional data set of the dental restoration and a three-dimensional data set of the oral mucosa; and
    determining a spatial region for an elastic production material within the dental restoration based on the calculated pressure distribution;
    wherein the dental restoration with the spatial region is manufactured such that pain or discomfort when wearing the dental restoration is reduced.
2. The method according to claim 1,
    wherein a production material for the spatial region is determined based on the pressure distribution.
3. The method according to claim 1,
    wherein the pressure distribution is calculated by a finite element method.

4. The method according to claim 1,
wherein the pressure distribution is calculated in a presence of a predetermined force on the dental restoration.

5. The method according to claim 4,
wherein the predetermined force is determined by a bite block sensor.

6. The method according to claim 1,
wherein a pressure distribution on the dental restoration is calculated from the pressure distribution on the oral mucosa.

7. The method according to claim 6,
wherein a thickness of the spatial region is proportional to the pressure distribution on the dental restoration.

8. The method according to claim 1,
wherein the production material in the spatial region has a lower modulus of elasticity than the production material outside the spatial region.

9. The method according to claim 1,
wherein the production of the dental restoration is carried out by means of a three-dimensional printing process.

10. The method according to claim 9,
wherein the three-dimensional printing process uses a free-jet material deposition.

11. A production device for producing a dental restoration, comprising:
a calculating processor for calculating a pressure distribution on an oral mucosa through the dental restoration based on a three-dimensional data set of the dental restoration and a three-dimensional data set of the oral mucosa; and
a determining processor for determining a spatial region for an elastic production material within the dental restoration based on the determined pressure distribution;

wherein the production device is configured to manufacture the dental restoration with the spatial region such that pain or discomfort when wearing the dental restoration is reduced.

12. The production device according to claim 11,
wherein the calculating processor is configured to calculate the pressure distribution using a finite element method.

13. The production device according to claim 11,
wherein the determining processor is configured to determine a thickness of the spatial region proportional to the pressure distribution on the dental restoration.

14. The production device according to claim 10,
wherein the production device is configured to use a production material having a lower modulus of elasticity within the spatial region than outside the spatial region.

15. The production device according to claim 11, wherein the production device comprises a 3D printer.

16. A method of producing a dental restoration, comprising the steps of:
calculating a pressure distribution on an oral mucosa through the dental restoration based on a three-dimensional data set of the dental restoration and a three-dimensional data set of the oral mucosa;
determining a spatial region for an elastic production material within the dental restoration based on the calculated pressure distribution; and
manufacturing the dental restoration with the spatial region by three-dimensional printing such that pain or discomfort when wearing the dental restoration is reduced.

* * * * *